(12) United States Patent
Schwengler

(10) Patent No.: US 10,098,008 B2
(45) Date of Patent: *Oct. 9, 2018

(54) OPTIMIZED DISTRIBUTION OF WIRELESS BROADBAND IN A BUILDING

(71) Applicant: CenturyLink Intellectual Property LLC, Denver, CO (US)

(72) Inventor: Thomas Schwengler, Lakewood, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,024

(22) Filed: Nov. 15, 2017

(65) Prior Publication Data

US 2018/0077583 A1 Mar. 15, 2018

Related U.S. Application Data

(63) Continuation of application No. 15/228,941, filed on Aug. 4, 2016, now Pat. No. 9,843,937, which is a
(Continued)

(51) Int. Cl.
*H04L 5/00* (2006.01)
*H04W 16/20* (2009.01)
*H04W 24/02* (2009.01)

(52) U.S. Cl.
CPC .......... *H04W 16/20* (2013.01); *H04L 5/0007* (2013.01); *H04L 5/0048* (2013.01); *H04W 24/02* (2013.01)

(58) Field of Classification Search
CPC ........ H01P 3/12; H01Q 1/007; H01Q 21/005; H04B 7/15507; H04L 5/0007;
(Continued)

(56) References Cited

U.S. PATENT DOCUMENTS 2,478,133 A 8/1949 Shanklin
3,445,844 A 5/1969 Grossi et al.
(Continued)

OTHER PUBLICATIONS

Cepni et al., Multi-carrier Signal Transmission through HVAC Ducts; Experimental Results for Channel Capacity, 2002, IEEE Proceedings, Vehicular Technology Conference, 2002, VTC 2002—Fall. 2002 IEEE 56th, vol. 1, p. 331-335.
(Continued)

*Primary Examiner* — Eric Nowlin
(74) *Attorney, Agent, or Firm* — Swanson & Bratschun, L.L.C.

(57) ABSTRACT

Methods and systems are disclosed for optimizing the distribution of a broadband wireless signal in a building. The methods and systems include at least one antenna inserted into a building ventilation system and transmitting a wireless broadband training sequence from a transmitter in communication with the antenna. The wireless broadband training sequence will include multiple orthogonal subcarriers. The methods and systems further include detecting the wireless broadband training sequence with a receiver in the building. In selected embodiments, the methods and systems include the steps of analyzing a parameter of the detected wireless broadband training sequence and optimizing a subsequently transmitted wireless broadband signal based at least in part upon the analyzed parameter of the wireless broadband training sequence.

20 Claims, 8 Drawing Sheets

Related U.S. Application Data continuation of application No. 14/860,079, filed on Sep. 21, 2015, now Pat. No. 9,445,281, which is a continuation of application No. 13/657,349, filed on Oct. 22, 2012, now Pat. No. 9,198,056.

(58) Field of Classification Search
CPC .... H04L 5/0048; H04W 16/00; H04W 16/20; H04W 24/02; H04W 88/085; H05K 9/0001
See application file for complete search history.

(56) References Cited

U.S. PATENT DOCUMENTS

| | | | |
|---|---|---|---|
| 5,661,802 A | 8/1997 | Nilssen | |
| 5,974,326 A | 10/1999 | Lowdon | |
| 5,977,851 A | 11/1999 | Stancil | |
| 5,994,984 A | 11/1999 | Stancil | |
| 5,999,094 A | 12/1999 | Nilssen | |
| 6,041,216 A | 3/2000 | Rose et al. | |
| 6,073,003 A | 6/2000 | Nilssen | |
| 6,781,477 B1 | 8/2004 | Stancil | |
| 6,801,753 B1 | 10/2004 | Keong | |
| 6,980,768 B2 | 12/2005 | Arend et al. | |
| 6,988,057 B2 | 1/2006 | Huang et al. | |
| 7,245,732 B2 | 7/2007 | Jorgensen et al. | |
| 7,426,231 B1 | 9/2008 | Dorfman | |
| 7,606,592 B2 | 10/2009 | Becker | |
| 7,616,704 B2* | 11/2009 | Li | H04B 7/0617 375/260 |
| 7,756,283 B2 | 7/2010 | Bramslow | |
| 8,131,306 B2 | 3/2012 | Ho et al. | |
| 8,155,900 B1 | 4/2012 | Adams | |
| 8,258,649 B2 | 9/2012 | Zyren | |
| 8,428,550 B2 | 4/2013 | Larsen | |
| 8,489,015 B2 | 7/2013 | Becker | |
| 8,587,387 B2 | 11/2013 | Lee | |
| 8,837,636 B2* | 9/2014 | Shi | H04L 27/2634 375/297 |
| 8,897,695 B2 | 11/2014 | Becker | |
| 9,066,224 B2 | 6/2015 | Schwengler | |
| 9,136,950 B2 | 9/2015 | Vann | |
| 9,166,754 B2* | 10/2015 | Lee | H04L 5/0048 |
| 9,198,056 B2 | 11/2015 | Schwengler | |
| 9,288,005 B2* | 3/2016 | Lee | H04L 5/0051 |
| 9,331,771 B2 | 5/2016 | Qin et al. | |
| 9,378,110 B2 | 6/2016 | Miyaoka | |
| 9,445,281 B2 | 9/2016 | Schwengler | |
| 9,473,326 B2* | 10/2016 | Huang | H04B 7/0413 |
| 9,608,740 B2 | 3/2017 | Henry et al. | |
| 9,712,212 B2 | 7/2017 | Treatch | |
| 9,843,937 B2 | 12/2017 | Schwengler | |
| 2003/0047390 A1 | 3/2003 | Crenella et al. | |
| 2003/0060194 A1 | 3/2003 | Arend et al. | |
| 2005/0096882 A1 | 5/2005 | Huang et al. | |
| 2005/0111449 A1* | 5/2005 | Moorti | H04B 1/38 370/389 |
| 2005/0113090 A1 | 5/2005 | Sharony | |
| 2005/0270151 A1 | 12/2005 | Winick | |
| 2006/0203935 A1* | 9/2006 | Li | H04B 7/0617 375/299 |
| 2006/0222195 A1 | 10/2006 | Bramslow | |
| 2007/0071120 A1* | 3/2007 | Talwar | H04L 27/2614 375/260 |
| 2008/0020801 A1 | 1/2008 | Fesas | |
| 2008/0267142 A1 | 10/2008 | Mushkin | |
| 2009/0008146 A1 | 1/2009 | Oleske | |
| 2009/0174614 A1 | 7/2009 | Stancil | |
| 2009/0238155 A1* | 9/2009 | Sun | H04L 5/0044 370/336 |
| 2009/0299532 A1 | 12/2009 | Zyren | |
| 2009/0325628 A1 | 12/2009 | Becker | |
| 2010/0070089 A1 | 3/2010 | Harrod et al. | |
| 2010/0086066 A1* | 4/2010 | Chrabieh | H04L 5/0007 375/260 |
| 2011/0028157 A1 | 2/2011 | Larsen | |
| 2011/0028161 A1 | 2/2011 | Larsen | |
| 2011/0143746 A1 | 6/2011 | Lehser | |
| 2012/0093100 A1 | 4/2012 | Qin et al. | |
| 2012/0122390 A1 | 5/2012 | Becker | |
| 2012/0278850 A1 | 11/2012 | Lee | |
| 2012/0310418 A1 | 12/2012 | Harrod et al. | |
| 2013/0005375 A1 | 1/2013 | Chen | |
| 2013/0028218 A1 | 1/2013 | Chun et al. | |
| 2013/0114393 A1* | 5/2013 | Lee | H04L 5/0048 370/210 |
| 2013/0115890 A1 | 5/2013 | Dore | |
| 2013/0165144 A1 | 6/2013 | Ziskind | |
| 2013/0169501 A1 | 7/2013 | Kummetz | |
| 2014/0002211 A1 | 1/2014 | Becker | |
| 2014/0064405 A1* | 3/2014 | Shi | H04L 25/03828 375/297 |
| 2014/0112166 A1 | 4/2014 | Schwengler | |
| 2014/0113671 A1 | 4/2014 | Schwengler | |
| 2015/0111507 A1 | 4/2015 | Alpert | |
| 2015/0207582 A1* | 7/2015 | Lee | H04L 5/0051 370/335 |
| 2015/0249927 A1 | 9/2015 | Schwengler | |
| 2015/0278063 A1 | 10/2015 | Miyaoka | |
| 2016/0014614 A1 | 1/2016 | Schwengler | |
| 2016/0069580 A1 | 3/2016 | Crisa' | |
| 2016/0072644 A1* | 3/2016 | Huang | H04B 7/0413 375/267 |
| 2016/0088594 A1* | 3/2016 | Xiong | H04W 4/70 370/329 |
| 2016/0100324 A1 | 4/2016 | Henry et al. | |
| 2016/0105271 A1* | 4/2016 | Shahrnaz | H04L 5/0058 370/329 |
| 2016/0182180 A1* | 6/2016 | Ou | H04L 27/2628 398/76 |
| 2016/0226559 A1 | 8/2016 | Miyaoka | |
| 2016/0233945 A1 | 8/2016 | Qin et al. | |
| 2016/0261310 A1 | 9/2016 | Fuchs et al. | |
| 2016/0295431 A1 | 10/2016 | Henry et al. | |
| 2016/0345182 A1 | 11/2016 | Schwengler | |
| 2016/0365943 A1 | 12/2016 | Henry et al. | |
| 2017/0018832 A1 | 1/2017 | Henry et al. | |
| 2017/0019189 A1 | 1/2017 | Henry et al. | |
| 2017/0026063 A1 | 1/2017 | Henry et al. | |
| 2017/0075677 A1 | 3/2017 | Gross et al. | |
| 2017/0085003 A1 | 3/2017 | Johnson et al. | |
| 2017/0099079 A1 | 4/2017 | Gross et al. | |
| 2017/0118056 A1* | 4/2017 | Aoki | H04L 27/2613 |
| 2017/0126347 A1* | 5/2017 | Ma | H04J 13/0003 |
| 2017/0181018 A1 | 6/2017 | Kitahara | |
| 2017/0215087 A1* | 7/2017 | Amizur | H04W 4/025 |
| 2017/0223725 A1* | 8/2017 | Xiong | H04W 4/70 |
| 2017/0237532 A1* | 8/2017 | Li | H04L 5/0007 370/338 |
| 2017/0346668 A1* | 11/2017 | Kenney | H04L 27/2626 |
| 2018/0007673 A1* | 1/2018 | Fwu | H04W 4/70 |
| 2018/0077583 A1* | 3/2018 | Schwengler | H04W 16/20 |

OTHER PUBLICATIONS

Chung et al., A radio communications network for voice and data in underground mines, Sep. 27, 2000, IEEE, 2000 Tencon Proceedings; Intelligent Systems and Technologies for the New Millennium; pp. I516-I521.

Coraiola et al., Using a pair of phased antennas to improve UHF receiption/transmission in tunnels; Aug. 6, 2002; IEEE Antennas and Propagation Manazine; vol. 42, Iss. 5; pp. 40-47.

Didascalou et al.; Subway Tunnel Guided Electromagnetic Wave Propagation at Mobile Communications Frequencies; Nov. 2011; IEEE Transactions on Antennas and Propagation; vol. 49, Iss. 11, pp. 1590-1596.

Lienard et al., Investigation on MIMO Channels in Subway Tunnels; Apr. 2003; IEEE Journal on Selected Areas in Communications; vol. 21, Iss.3; pp. 332-339.

Nikitin et al., Analysis of Heating, Ventilation, and Air Conditioning Ducts as a Radio Frequency Communication Channel: A Disserta-

(56) References Cited

OTHER PUBLICATIONS tion, Aug. 2002, Carnegie Mellon University, Electrical and Computer Engineering.

Nikitin et al., Propagation Model for the HVAC Duct as a Communication Channel, May 2003, IEEE Transactions on Antennas and Propagation, vol. 51, No. 5, p. 945-951.

Stancil et al., High Speed Internet Access via HVAC Ducts; A New Approach, Proceedings of the IEEE Global Telecommunications Conference (GLOBECOM'01), vol. 6, pp. 3604-3607, San Antonio, TX, Nov. 2001.

Tonguz et al., A Simple Path-Loss Prediction Model for HVAC Systems, Jul. 2004, IEEE Transactions on Vehicular Technology, vol. 53, No. 4, p. 1203-1214.

* cited by examiner

OPTIMIZED DISTRIBUTION OF WIRELESS BROADBAND IN A BUILDING

CROSS REFERENCE TO RELATED APPLICATIONS

This application is a continuation of U.S. patent application Ser. No. 15/228,941, filed Aug. 4, 2016 by Thomas Schwengler and titled, "Optimized Distribution of Wireless Broadband in a Building", which is a continuation of U.S. patent application Ser. No. 14/860,079 (now U.S. Pat. No. 9,445,281), filed Sep. 21, 2015 by Thomas Schwengler and titled, "Optimized Distribution of Wireless Broadband in a Building", which is a continuation of U.S. patent application Ser. No. 13/657,349 (now U.S. Pat. No. 9,198,056), filed Oct. 22, 2012 by Thomas Schwengler and titled, "Optimized Distribution of Wireless Broadband in a Building", the entire teachings of which are hereby incorporated by reference in their entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to systems and methods for distributing wireless broadband signals throughout a building.

BACKGROUND

The wireless distribution of broadband signals within a building is becoming commonplace. Wi-Fi is now the most common way people access the Internet. Smart phones compliant with 3G and 4G standards are commonly used inside buildings. Personal computers, laptop computers, smart phones, tablet computers, PDAs and other portable devices are typically configured to receive a wireless broadband signal. In addition, televisions, DVD players, Blu-ray disc players, smart thermostats, printers, copiers and many other digitally enabled home or business appliances are configured for wireless network access. To meet the needs of these and similar devices, many buildings now include a wireless access point (WAP), base station or repeater connected to a wired data or communication network to send and receive data or communication signals from the wired network to wireless devices within or near the building.

One problem with the transmission of wireless broadband signals within a building is difficulty obtaining a sufficiently strong communication channel between the WAP or repeater and various receiving devices. For example, the exceptionally popular Wi-Fi standard defined in IEEE 802.11b is a low powered solution (less than 1 W) having a range of no more than 300 feet from the transmitter. The closer a receiving device is to the transmitter the better chance the receiver will have of connecting and typically the faster the Wi-Fi uplink/downlink performance will be. Connectivity and signal strength problems can be exacerbated by the walls, floors, ceilings and other surfaces or barriers present in a typical building which can cause signal attenuation and reflection.

Wireless broadband signals are transmitted according to an IEEE standard such as the 802.11a/b/g/n, 802.11ac/ad, LTE, LTE Advanced or WiMAX 802.16d/e standards. These standards in many instances require a broadband signal having multiple orthogonal subcarriers. For example, a signal may be communicated in Orthogonal Frequency Division Modulation (OFDM) or Orthogonal Frequency Division Multiple Access (OFDMA) format. Signals having multiple orthogonal subcarriers are well-suited to multiuser access. Each user communicates with the WAP or repeater over a set of dedicated or time-allocated sub channels depending upon the signal format used. Accordingly, it is desirable to intelligently allocate subchannels to various users. Intelligent allocation provides each user with dedicated or time-allocated sub channels having sufficient signal strength and signal-to-noise ratio for high-quality communication.

U.S. Pat. No. 6,980,768 teaches the use of a building ventilation system as a waveguide to enhance the distribution of a spread spectrum signal within a building, in particular a code division multiple access (CDMA) telecommunications signal. The U.S. Pat. No. 6,980,768 describes how the ducts of a conventional ventilation system can operate as wave guides. Bends, kinks, rough surfaces, splits, and variations in duct size or configuration will inevitably cause fading in any RF signal transmitted through a duct waveguide. The spread spectrum nature of the signal described in the U.S. Pat. No. 6,980,768 provides little opportunity for transmission optimization within a ventilation system. In addition, CDMA signals do not have multiple orthogonal subcarriers. Therefore, there is no opportunity or need to address the optimization of subcarrier allocation. Hence, there is a need for solutions that can overcome some or all of the technical hurdles identified above to allow the effective distribution of broadband wireless signals having multiple orthogonal subcarriers in a building.

BRIEF SUMMARY

One embodiment disclosed herein is a method of optimizing the distribution of a broadband wireless signal in a building. The method includes the steps of inserting at least one antenna into a building ventilation system and transmitting a wireless broadband signal from a transmitter in communication with the antenna. The wireless broadband signal will include multiple orthogonal subcarriers. The method further includes detecting the wireless broadband signal with a receiver in the building.

In selected embodiments, the method may include the steps of analyzing a parameter of the detected wireless broadband signal and optimizing the wireless broadband signal based at least in part upon the analyzed parameter. Signal optimization may include, but is not limited to assigning a subcarrier allocation based at least in part upon the analyzed parameter. In those embodiments where subcarrier allocation is performed, the allocation may be performed by a receiver, the transmitter or a combination of devices. The method may be implemented with various alternative signal optimization techniques, including but not limited to selecting a subcarrier spacing based at least in part upon the analyzed parameter, forward error correction (FEC), signal modulation, signal preconditioning, symbol repetition or other techniques based on the different propagation characteristics of the different client devices.

The method may also include estimating a signal propagation characteristic for a modeled transmission line between the antenna and at least one receiver. The modeled transmission line may include a duct, an opening in the duct and free air between the opening and the at least one receiver. In the foregoing embodiment, signal optimization, for example, intelligent subcarrier allocation, may be based at least in part upon a combination of the analyzed parameter and the estimated signal propagation characteristic. In particular, the estimated signal propagation characteristic may be an estimate of the coherence bandwidth of the modeled transmission line; estimated for example by computing a total multipath delay spread from a duct delay spread, an opening delay spread and a free air delay spread.

Analyzing a parameter of the detected wireless broadband signal may alternatively include analyzing a parameter of at least one pilot subcarrier, analyzing a parameter of at least one training sequence, or analyzing a sub-carrier power level or signal to noise ratio. In certain instances, the wireless broadband signal may be detected with multiple receivers at different physical locations within the building. The wireless broadband signal comprising multiple orthogonal subcarriers may be an OFDM signal, an OFDMA signal and a SC-FDMA signal. Thus, the wireless broadband signal may be transmitted according to an IEEE 802.11a/b/g/n, 802.11ac/ad, LTE, LTE Advanced or WiMAX 802.16d/e standard.

An alternative embodiment is a communications system including a transmitter of a broadband wireless signal comprising multiple orthogonal subcarriers, a ventilation system within a building, and at least one antenna in communication with the transmitter. In the disclosed system embodiments, the antenna is positioned within a duct which acts as a leaky hollow waveguide. System embodiments also include a processor and a non-transitory machine readable medium having encoded thereon a set of instructions executable by the processor to perform one or more operations. In particular, the set of instructions includes instructions to analyze a parameter of a wireless broadband signal received by the receiver and instructions to optimize the wireless broadband signal based at least in part upon the analyzed parameter.

Alternative system embodiments include a processor implementing instructions to optimize the wireless broadband signal by assigning a subcarrier allocation at least in part upon the analyzed parameter. In addition, the system may include instructions to analyze a parameter of at least one pilot subcarrier or at least one training sequence. Furthermore, the system may include instructions to estimate a signal propagation characteristic for a modeled transmission line between the antenna and at least one receiver, optimize the wireless broadband signal based at least in part upon the analyzed parameter and the estimated signal propagation characteristic.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
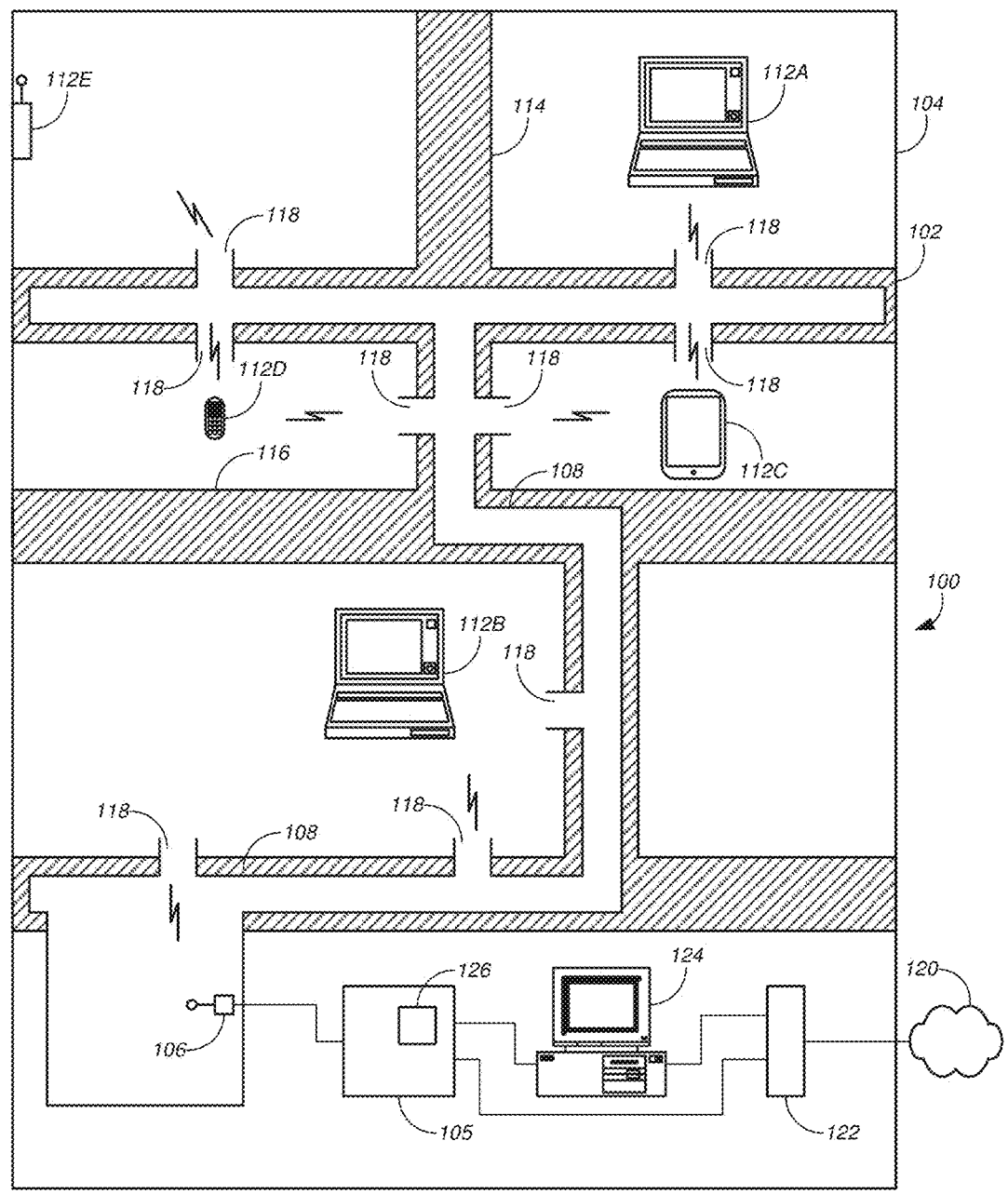
FIG. 1 is a block diagram illustrating systems for providing optimized wireless communication within a building, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

One set of embodiments offers solutions that can provide for the effective and optimized distribution of broadband wireless signals within a building. In general, the embodiments disclosed herein feature the distribution of broadband wireless signals in part through the heating, ventilation and air-conditioning (HVAC) system of a building. A typical HVAC system includes extensive ductwork, air inlets, air outlets, fans, heaters, air conditioners, humidifiers, dehumidifiers and other apparatus designed to condition and move air throughout a building. All of the foregoing elements are collectively referred to herein as a ventilation system or building ventilation system. The ducts of a building ventilation system can be adapted for use as hollow waveguides as described in detail below.

The transmitted wireless broadband signal of the various embodiments described herein is a wireless broadband signal having multiple orthogonal subcarriers. For example, the wireless broadband signal may, be but is not limited to, an Orthogonal Frequency Division Modulation (OFDM) signal, an Orthogonal Frequency Division Multiple Access (OFDMA) signal or a Single-carrier Frequency Division Multiple Access (SC-FDMA) signal transmitted according to an IEEE 802.11a/b/g/n, 802.11ac/ad, LTE, LTE Advanced or WiMAX 802.16d/e/m standards. Alternative signal types featuring the use of multiple orthogonal subcarriers are within the scope of the present disclosure. The foregoing signal types will be collectively referred to herein as "signals having multiple orthogonal subcarriers".

An OFDM signal encodes digital data on multiple carrier frequencies known as subcarriers. A large number of closely spaced orthogonal subcarrier signals are thus used to carry data to a receiver. The data is divided into several parallel data streams or channels, one for each subcarrier. Each subcarrier is modulated with a conventional modulation scheme at a relatively low symbol rate, to maintain total data rates similar to conventional single-carrier modulation schemes in the same bandwidth.

One advantage of OFDM over single-carrier transmissions schemes is the ability of an OFDM signal to cope with severe channel conditions, for example, attenuation of high frequencies, narrowband interference and frequency-selective fading due to multipath. In OFDM, the subcarrier frequencies are chosen so that the subcarriers are orthogonal to each other, meaning that cross-talk between the subchannels is eliminated and inter-carrier guard bands are not required. Channel equalization is simplified because OFDM may be viewed as using many slowly modulated narrowband signals rather than one rapidly modulated wideband signal. 802.11a, WLAN, 802.16 and certain WiMAX technologies use OFDM.

OFDMA is a multi-user version of OFDM. Multiple access is achieved in OFDMA by assigning subsets of the subcarriers to individual users. Thus, OFDMA allows simultaneous transmission to various users over discrete sets of subcarriers. On the contrary, an OFDM transmission may require time-division multiplexing or time-domain statistical multiplexing to meet the needs of multiple users' devices at different locations. OFDMA is used in certain 802.16 WiMAX, LTE, 802.20 MBWA technologies and standards. OFDMA is also a candidate access method for IEEE 802.22 Wireless Regional Area Networks (WRAN).

SC-FDMA is also a frequency-division multiple access scheme. SC-FDMA provides for the assignment of multiple users to a shared communication resource and can be viewed as a linearly pre-coded OFDMA scheme. In SC-FDMA, multiple access among users is also made possible by assigning different users different sets of non-overlapping subcarriers. The embodiments disclosed herein concern the transmission of signals by any means described above and any similar existing or future data or communication signal suitable for wireless transmission using multiple orthogonal subcarriers. Various systems and methods for signal transmission are described in detail below.

One embodiment is a communications system 100 which is optimized to use a building ventilation system 102 as a system of waveguides, thus enhancing the quality of wireless broadband coverage within the building 104. Different duct paths and variations in duct size, the rough surface of some flexible ducts, and the variability and the unpredictability of air flow splits and bends cause different fades within the broadband radio signal. OFDM systems use the entire spectrum, but some subcarrier modulations can be optimized depending on individual fadings. OFDMA allows for different frequency-selective fadings to be identified and then used to optimize the selection of different subcarriers for each of multiple device users.

As detailed below, subcarriers can be intelligently chosen to optimize different paths. Therefore one user in wireless communication with an access point, repeater or other transmitter through a particular air vent will be assigned a subset of subchannels which is different from another user near another vent in a different location. The subcarrier subset can be chosen to optimize ODFM properties. Training sequences and pilot subcarriers can be used within the fairly static ducting transmission environment to optimize the choice of subcarriers.

For example, FIG. 1 schematically illustrates a communications system 100 located within a building 104. The communications system includes at least one transmitter 105. The transmitter 105 can be, but is not limited to, a wireless access point (WAP) such as a wireless router, a 3G or 4G repeater, a transmission base station or any other device which transmits data or communication signals over radio frequencies. The transmitter 105 is thus enabled to transmit a RF signal according to an IEEE standard. For example, the transmitter 105 may transmit a wireless broadband signal according to the 802.11a/b/g/n, 802.11ac, LTE, or LTE Advanced, 802.16 WiMAX, 802.20 MBWA or other standards.

It may be noted from FIG. 1 that the transmitter 105 is associated with and transmits an RF signal through at least one transmission antenna 106. Furthermore, the transmission antenna 106 is inserted into the space within one or more ducts 108 of a ventilation system 102 of the building 104 such that the metal ducts operate as hollow waveguides for the RF signal. The communications system 100 also includes one or more receivers 112. A receiver 112 is defined as any wireless device configured to communicate wirelessly with the transmitter 104. Thus the receiver 112 could be a personal computer 112A, laptop computer 112B, tablet computer 112C, a cell phone or smart phone 112D, a PDA, a smart thermometer 112E, a television, video player or recording device, a smart appliance, and alarm system, a printer, a copier, a fax machine or any other device configured to receive and transmit wireless broadband communications.

As also shown on FIG. 1, the receivers 112 may be distributed throughout the building 104 with any number of walls 114, floors 116 or ceilings position between a given receiver 112 and the transmitter 105 and antenna 106. Broadband wireless signals transmitted from the transmitter 105 and antenna 106 are at least in part guided through the ventilation system 102 by the ducts 108 acting as hollow waveguides. The ducts 108 may in certain instances be leaky waveguides which allow a portion of the wireless signal to pass outside of the ducts through the duct walls. More typically however, as shown in FIG. 1, the ventilation system 102 will include multiple vents 118 or other openings providing for air exchange with the various rooms of the building 104. Two-way wireless communication may occur between the transmitter 105 one or more receivers 112 through the vents 118 of the ventilation system 102.

As also illustrated on FIG. 1, the transmitter 105 is typically connected to at least one wired network 120 in which may be located inside of or outside of the building 104. Typically, the transmitter 105 is connected to the wired network 120 with one or more electrical or optical cables and one or more intermediate devices. The wired network 120 can be any network including but not limited to a local area network (LAN), a wide area network (WAN), the Internet, a cellular telephone communications network, a distributed antenna network (DAS), or a combination of networks. For example, the transmitter 105 may be attached to a LAN which is then attached to the Internet through a dedicated data communications line, a DSL modem 122, a cable modem or other supplemental infrastructure. The system 100 may include any number of supplemental or peripheral elements including but not limited to a computer 124 in wired communication with the system 100.

In FIG. 1, the transmitter 105 is shown placed outside of the ventilation system 102 with the antenna being placed within the ventilation system 102. This configuration is not limiting. Alternatively, the transmitter 105 may be located inside of a duct 108 or other element of a building ventilation system 102.

The system schematically illustrated in FIG. 1 may be utilized to implement various alternative methods of optimizing the distribution of a broadband wireless signal in a building. For example, as shown in the flowchart representation of FIG. 2, a wireless signal distribution method 200 may include the initial insertion of at least one and potentially many antennas 106 into a building ventilation system 102 (Step 202). As noted above the antenna 106 is in communication with a transmitter 105 and configured to broadcast at least one type of broadband signal. Thus, the method further includes the transmission of a wireless broadband signal having multiple orthogonal subcarriers from the transmitter 105 through the antenna 106 (step 204). The transmitted signal propagates through the building duct work 108 and either leaks from the duct work or more typically is emitted from a given duct 108 through one or more vents 118. In either case the wireless broadband signal is propagated through free air to a wireless broadband device having a receiver (step 206).

Typically, as shown in FIG. 1 the wireless broadband signal will be simultaneously detected with multiple receivers associated with multiple wireless devices 112 positioned at various locations throughout a building. Returning to FIG. 2, the wireless signal distribution method 200 may optionally further includes analyzing a selected parameter of the wireless broadband signal (step 208).

As noted above, the wireless broadband signal includes multiple orthogonal subcarriers. If the signal is an OFDM or similar signal, the entire signal wave front, including all subcarriers may be time-divided between multiple wireless devices 112. Alternatively, if the signal is an OFDMA or similar signal a subset of all sub channels may be assigned by a subcarrier scheduling processing system to each active wireless device 112. Thus, the step of analyzing a selected parameter of the wireless broadband signal may include but is not limited to analyzing a transmission parameter associated with at least one and possibly multiple subcarriers. Analysis can be performed on any signal attribute including but not limited to, signal or subcarrier power level, signal or subcarrier signal-to-noise ratio, signal or subcarrier throughput, signal or subcarrier latency or other parameters. Analysis can be performed upon a subcarrier actively carrying data or communication symbols or packets or analysis can be performed upon a dedicated pilot subcarrier. Alternatively, analysis can be performed on the subcarriers of a dedicated training sequence as described in detail below.

Effective wireless communication between a device 112 and the transmitter 105 requires that symbols or packets be transmitted over a set of subcarriers having high transmission and reception quality. Many distinct paths exist through the ducts 108 of the ventilation system 110. The path to a specific vent 118 most closely associated with a selected device, 112A for example, is different from the path to a specific vent 118 most closely associated with a different device, 112E, for example. As noted above, each duct and vent combination provides a propagation environment having different propagation characteristics due to distance, bends, duct diameters, duct surface structure and other factors. The propagation characteristics of a selected pathway through the ventilation system typically changes only slowly. In addition the propagation characteristics of a selected pathway through the ventilation system will cause different frequency-selective signal fading among different subcarriers. Thus, in one representative embodiment, the parameter analyzed in step 208 may be used to optimize the transmitted signal by, for example, intelligently and autonomously assign a subcarrier allocation based at least in part upon the analyzed parameter (step 210).

Alternatively, or in conjunction with the above described optimization methods, optimization may occur through forward error correction (FEC) which can be implemented when some subcarriers are attenuated. In addition, an OFDM system cannot do true subcarrier allocation, but optimization can occur instead by FEC, modulation, preconditioning, symbol repetition or other techniques based on the different propagation characteristics of the different client devices. For example, if a user has bad propagation on half the subcarriers, but the system is not capable of allocating these separately, the system can implement FEC redundancy, signal modulation, signal preconditioning, symbol repetition or other techniques for that customer; thus no real subcarrier allocation occurs, but subcarrier optimization occurs through a similar use of the measured parameter.

Typically the analysis and subcarrier optimization or allocation steps (steps 208 and 210 respectively) will be performed in a processing system 126 or scheduler processing encoded instructions providing for signal analysis and intelligent subcarrier optimization or allocation. The processing system 126 may be included within or associated with any wireless device 112. Alternatively, as shown in FIG. 1, the processing system 126 may be included within or associated with the transmitter 104. Alternatively the processing system 126 may be included within or associated with a peripheral device, for example computer 124. Alternatively, the processing system may be implemented with multiple separate processors which are distributed among various devices, but in communication with each other. For example, a processor providing for signal analysis may be included within or associated with one or more wireless devices 112. A processor associated with the transmitter may receive signal analysis from various devices 112 and then make intelligent subcarrier optimization or allocation decisions. In any of the above cases, the intelligent subcarrier optimization and/or allocation will be implemented by the transmitter. Thus, the transmitter may transmit a subset of time-divided or wavelength-divided subcarriers or an OFDM signal to each wireless device 112 which subset of subcarriers or OFDM signal has been optimized or selected for optimized propagation through the ventilation system 110, vents 118 and free air to one or more devices 112.

Intelligent subcarrier optimization and allocation decisions may be based entirely or in part upon the analysis of a selected parameter of the wireless broadband signal. Other factors which may optionally be considered in the intelligent subcarrier allocation process include but are not limited to available resources, customer demand and other considerations.

As noted above the transmission environment within a duct and vent system changes only slowly. Nonetheless, changes can occur outside of the ventilation system rapidly, for example a cell phone user may move from one room within the building to another. Thus, it may be advantageous to repeat the signal analysis and subcarrier allocation steps 208 and 210 continuously or at selected intervals.

Figure 3:
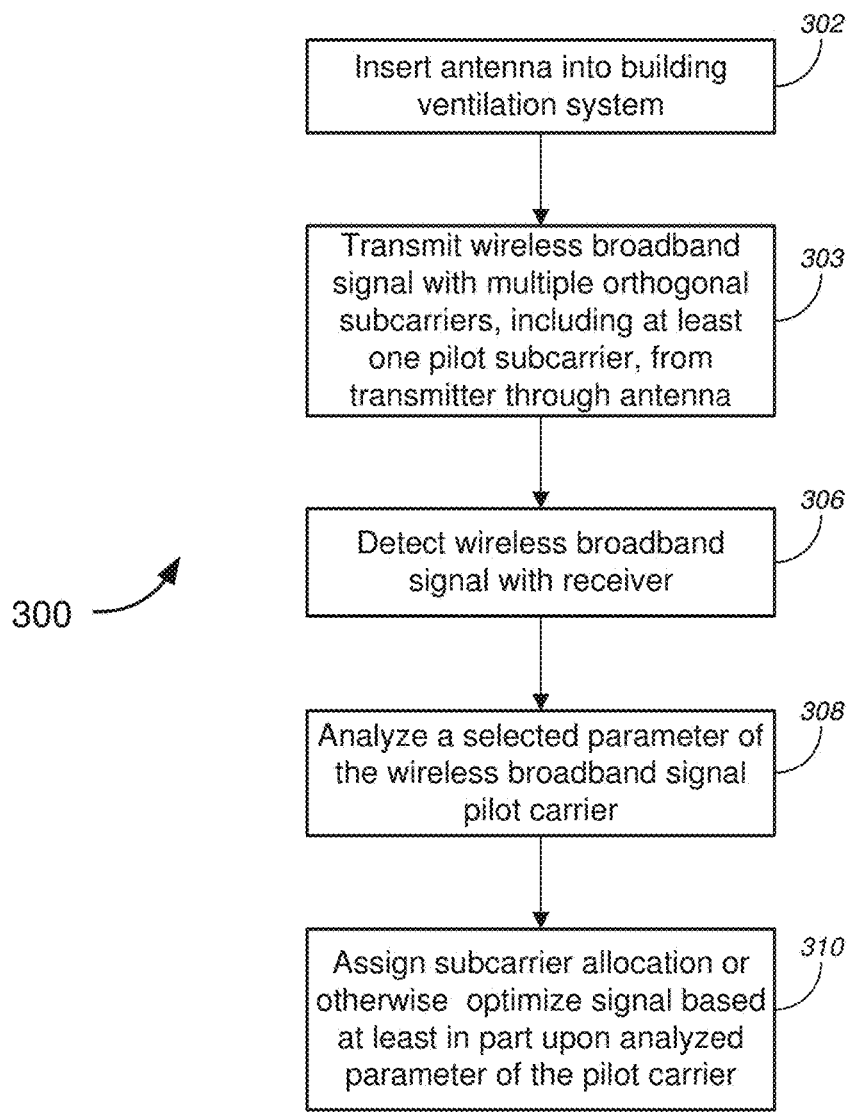
FIG. 3 is a process flow diagram illustrating an alternative method of providing optimized wireless communication within a building, in accordance with various embodiments.

As noted above, signal analysis can occur with respect to dedicated pilot subcarriers included in the RF signal and possibly associated with specific blocks of subcarriers. For example, as shown in FIG. 3, an alternative method 300 may include the insertion of an antenna into a building ventilation system as described above (step 302). Transmission of a wireless broadband signal with multiple orthogonal subcarriers may include transmission of one or more pilot subcarriers from the transmitter (step 304). Subsequently, the signal including the pilot subcarriers may be detected (step 306) and analyzed (step 308). Analysis results are communicated to a processing system 126 or scheduler. Intelligent system parameters setting, such as subcarrier optimization or subcarrier allocations may then be assigned based at least in part upon the analyzed parameter of one or more pilot subcarrier signals (Step 310).

Figure 4:
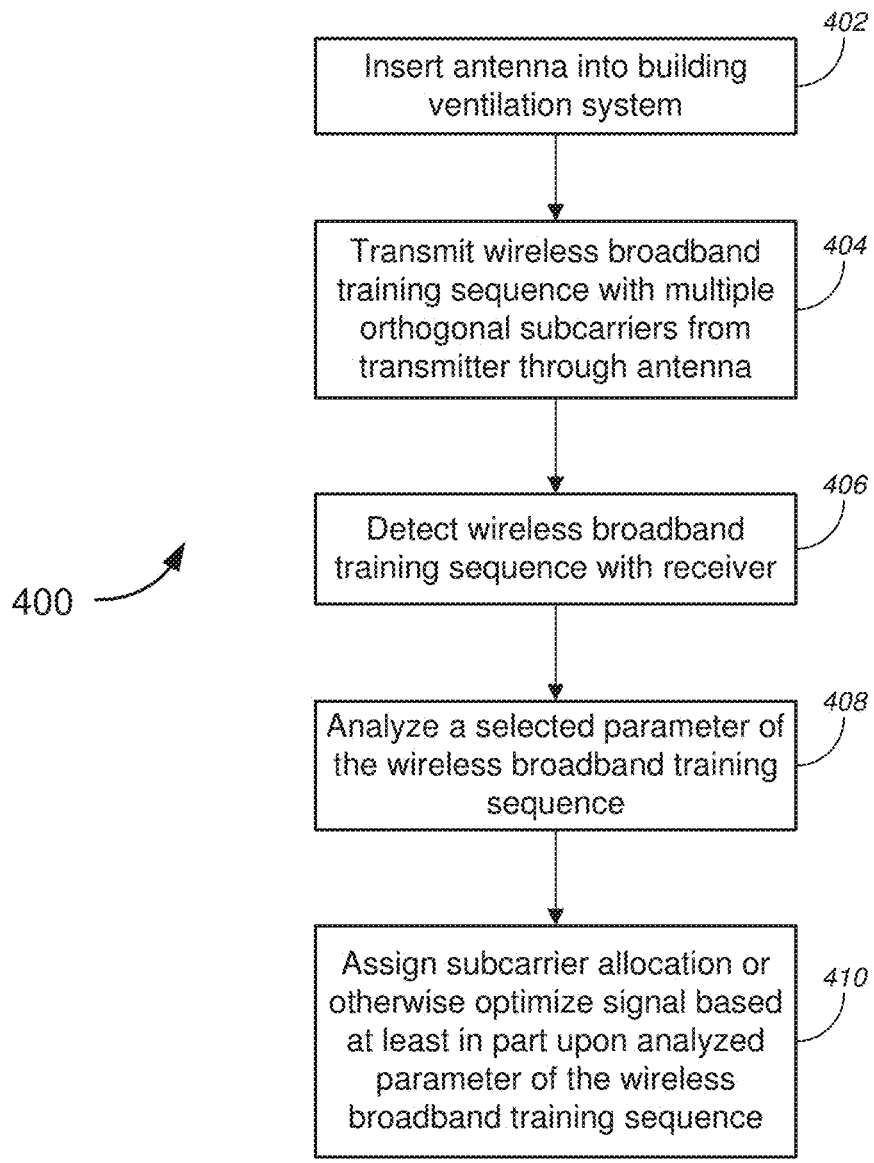
FIG. 4 is a process flow diagram illustrating an alternative method of providing optimized wireless communication within a building, in accordance with various embodiments.

Alternatively, as shown in FIG. 4, a method 400 may begin with the insertion of an antenna into a building ventilation system (step 402). Then, a wireless broadband training sequence having multiple orthogonal subcarriers may be transmitted from the transmitter through the antenna (step 404). The training sequence will be detected by a wireless device 112 (step 406) and analyzed (step 408) such that the analysis results are communicated to a processing system 126 or scheduler. Intelligent signal optimization, including but not limited to subcarrier allocation may then be accomplished at least in part upon the analyzed parameter of the transmitted training sequence (step 410). The training sequence may be transmitted when a device 112 first connects with the transmitter 105, alternatively the training sequence may be transmitted continuously or periodically.

In an alternative method embodiment 500, subcarrier allocation or other signal optimization is based at least in part upon an estimated signal propagation characteristic. As noted above, each location having a wireless device 112 will have a different set of propagation characteristics dictated in part by the characteristics of the transmission path through various ducts, vents and free air between the transmitter and selected device. Signal propagation characteristic(s) can be estimated based upon a modeled transmission line between devices. An estimated signal propagation characteristic may be used instead of (or along with) a measured signal parameter to support intelligent signal optimization or subcarrier allocation decisions.

Figure 5:
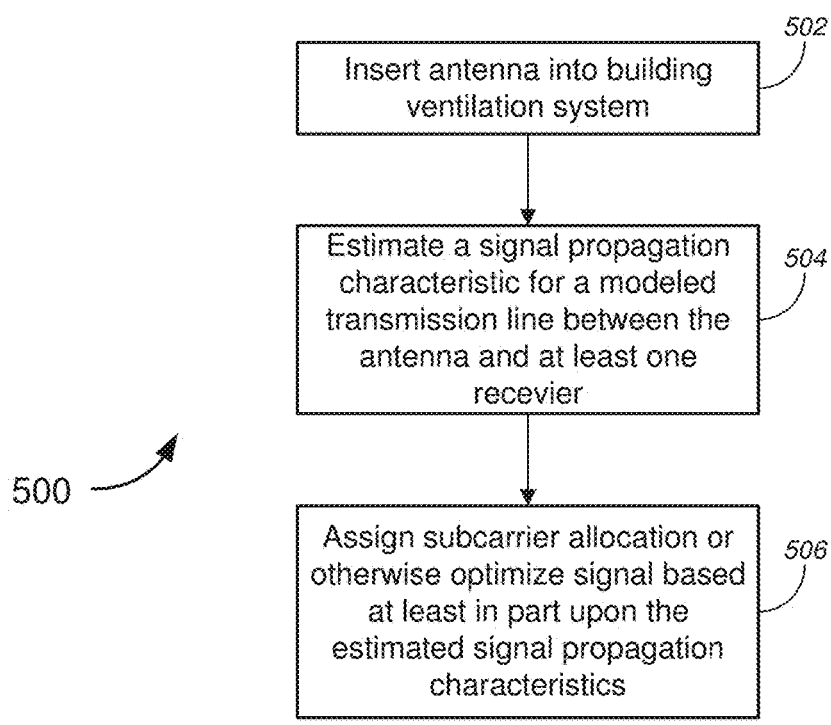
FIG. 5 is a process flow diagram illustrating an alternative method of providing optimized wireless communication within a building, in accordance with various embodiments.

For example, as shown in FIG. 5, a method 500 may include the step of inserting an antenna into a building ventilation system (step 502). An estimate of at least one signal propagation characteristic for a modeled transmission line between the antenna and at least one receiver may be made (step 504). A signal propagation characteristic may, for example, be an estimate of the coherence bandwidth of the modeled transmission line. The coherence bandwidth may in turn be estimated by computing a total multipath delay spread from a duct delay spread, an opening (or vent) delay spread and a free air delay spread.

Figure 8:
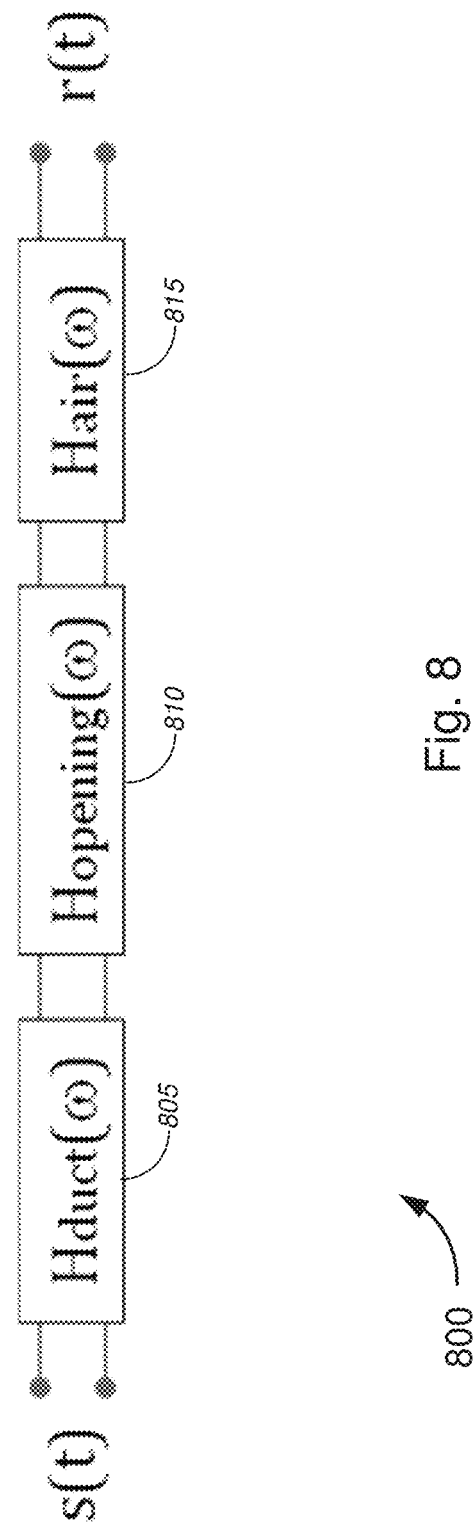
FIG. 8 represents a propagation characteristic (such as an S-parameter), in accordance with various embodiments.

More specifically, as shown in FIG. 8, a propagation characteristic 800 (such as an S-parameter) can be estimated where a path from the transmitter 105 to receiver 112 can be modeled by a transmission line characteristic, or the usual impulse response filter parameters.

Where Hduct 805 is the impulse response of the ducting, Hopening 810 the impulse response of the vent (usually a vent is fabricated from a plastic and thus will have little impact at frequencies in the MHz to a few GHz, but still will have a horn-feeder characteristic), and Hair 815 is the typically small indoor free-space area between vent and receiver in a selected room.

In order to understand the frequency selective aspect of a modeled system, it is important to estimate the coherence bandwidth of the system (Tc), which is related to the multipath delay spread ($\sigma$). Given that the three propagation environments are independent, the total delay spread (being the centered second moment of the time-delay statistic) can be computed as $=\sqrt{\Sigma_{i=0}^{n}\sigma_i^2}$, based upon the following parameters:

Duct delay spread: network analyzer measurements in portions of ducts show 10-40 ns per 10 m of duct. Generally duct multipath seems to remain below 80 ns-100 ns.

Vent opening is much like a large horn, has little or no direct influence on delay spread, but directs waves within the room, which influence is accounted for in the free-space delay spread.

Free space delay spread indoor is generally measured to be less than 100 ns (can be more in large offices, but directional vents limit it to 100 ns.

Overall system delay spread is therefore on the order of 100-150 ns, perhaps more in large ducts in enterprise environments—though the duct component never seems overwhelming.

Coherence bandwidth can be approximated for different correlations:

$$(90\%)B_c \approx \frac{1}{50\sigma_\tau}, (50\%)B_c \approx \frac{1}{5\sigma_\tau}$$

so coherence bandwidth can be estimated from 150 kHz to 2 MHz; which is well suited for OFDMA system in the typical 5 to 20 MHz channels used for LTE for instance, as well as the 20-100+MHz channels used in wireless LAN systems.

Similar considerations can lead to a design for particular parameters of the physical layer of an OFDM system. Symbol length is usually designed to be greater than maximum delay spread by an order of magnitude. To cover large ducts, this limit may be taken to be 200 ns, so a symbol length of 2 microseconds is appropriate for an OFDM duct system, leading to a subcarrier separation of $\Delta f=1/Ts$ of 500 kHz (or less). The typically low observed delay spread makes duct propagation for OFDM/OFDMA/SD-FDMA system well adapted to most physical layer standards. The more restrictive standards (i.e. 802.11n with shortened guard intervals) are also well suited for duct propagation. The more tolerant delay spread standards like WiMAX and LTE will be even more likely to work well when propagated in a building ventilation system.

Returning to FIG. 5, the method 500 may further include transmitting wireless broadband signals with multiple orthogonal subcarriers from the transmitter to various wireless devices. The transmitted signal will have a signal optimized, for example by intelligent subcarrier assignment based at least in part upon an estimated signal propagation characteristic as described above (step 506).

Figure 2:
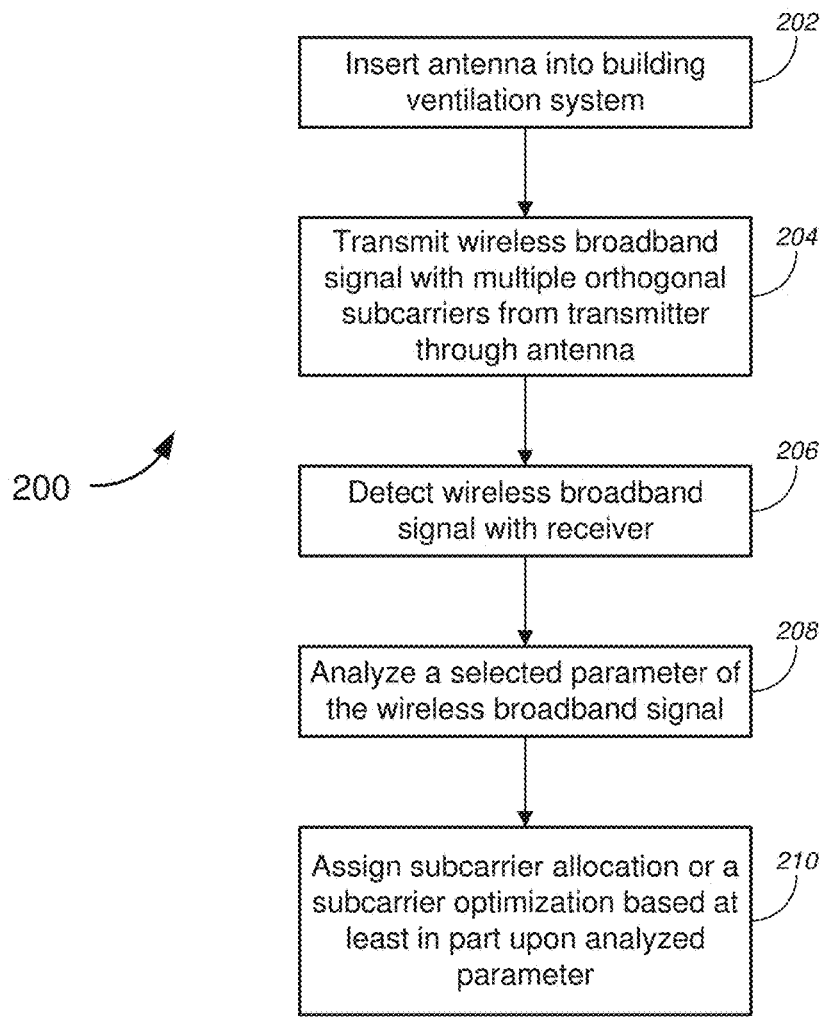
FIG. 2 is a process flow diagram illustrating a method of providing optimized wireless communication within a building, in accordance with various embodiments.
Figure 6:
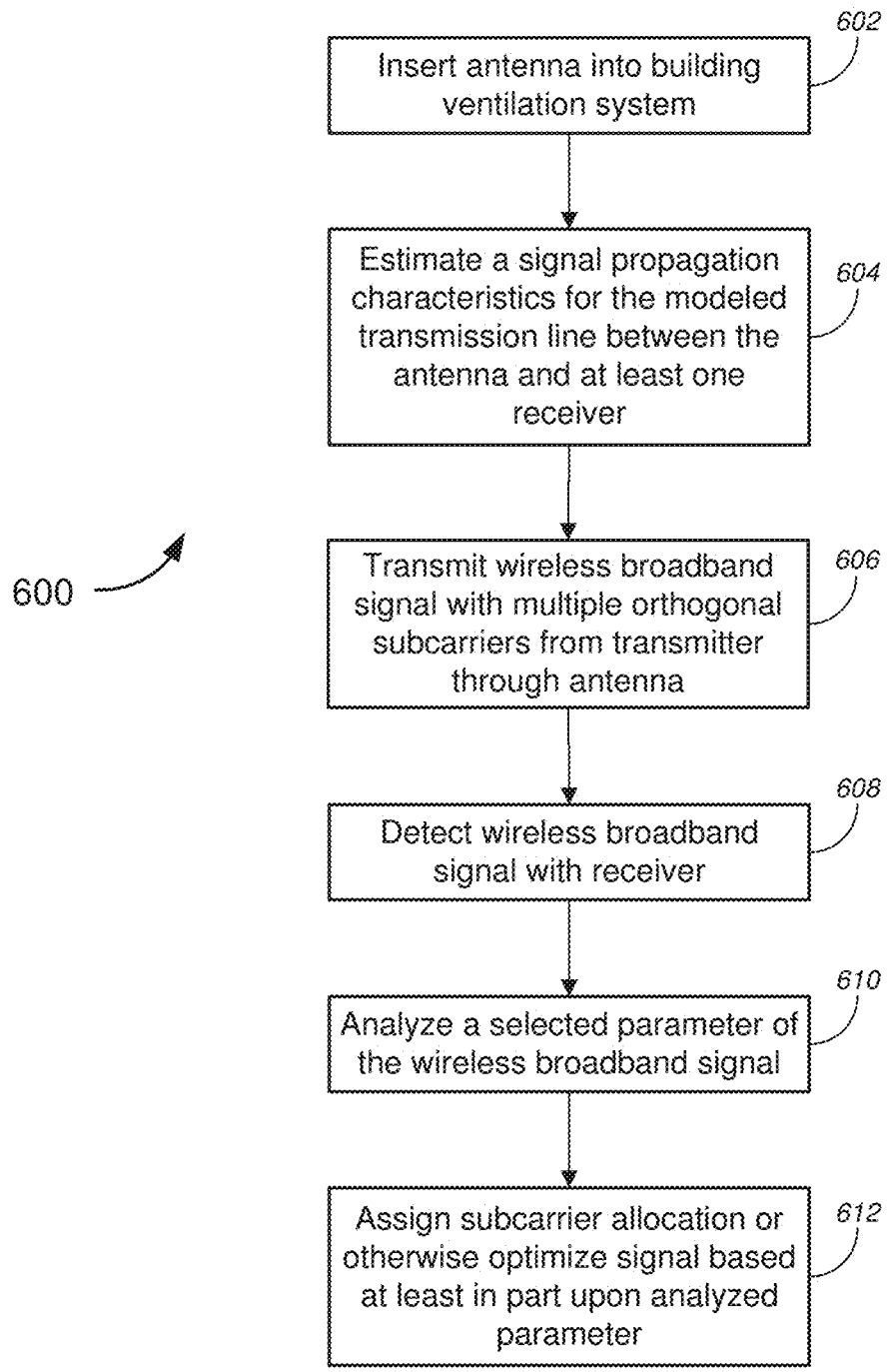
FIG. 6 is a process flow diagram illustrating an alternative method of providing optimized wireless communication within a building, in accordance with various embodiments.

As shown in FIG. 6, an alternative method 600 may combine the signal optimization and/or subcarrier allocation techniques of FIGS. 2-4 with the method of FIG. 5. For example the method 600 may rely at least in part upon an estimate of at least one signal propagation characteristic (step 604) along with analysis of a selected parameter of the wireless broadband signal actually transmitted between a transmitter and device (step 610) to intelligently optimize the signal, for example by intelligent subcarrier allocations (step 612).

Figure 7:
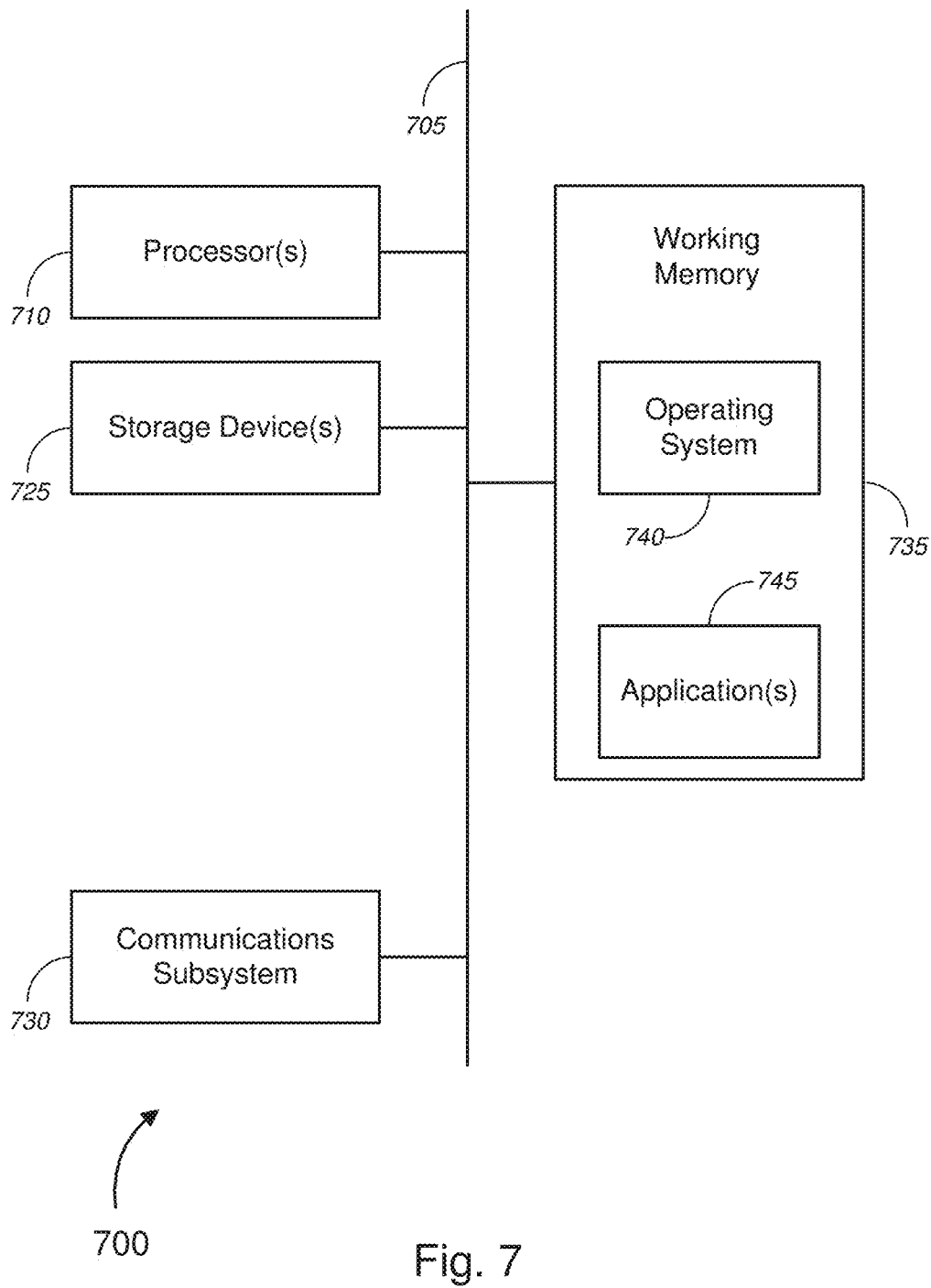
FIG. 7 is a generalized schematic diagram illustrating a processing system, in accordance with various embodiments.

The embodiments described above rely upon a processing system 126 associated with a device 112, the transmitter 105, a peripheral scheduler or distributed among multiple devices to make and implement intelligent signal optimization and/or subcarrier allocation determinations. FIG. 7 provides a schematic illustration of one embodiment of a processing system 700 that can perform the methods provided by various other embodiments, as described herein, and/or can function as the scheduler. It is important to note that the processing system 700 need not be and typically will not be a standalone device. The processing system 700 may be associated with or housed within one or more wireless devices 112, the transmitter 105 or a standalone device. It should also be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The processing system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like).

The processing system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The processing system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described above, to name one example), with other computer systems, and/or with any other devices described herein. In many embodiments, the processing system 700 will further comprise a working memory 735, which can include a RAM or ROM device.

The processing system 700 also may comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the processing system 700 and/or might take the form of source and/or installable code, which, upon compilation and/or installation on the processing system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a processor (such as the processor 710) to perform methods in accordance with various embodiments of the invention. According to a set of embodiments, some or all of the procedures of such methods are performed by the processing system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operation in a specific fashion. In an embodiment implemented using the processing system 700, various computer readable media might be involved in providing instructions/code to processor(s) 710 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of optimizing the distribution of a broadband wireless signal in a building comprising:
   inserting at least one antenna into a building ventilation system associated with a building;
   transmitting from a single location a wireless broadband training sequence from the at least one antenna in communication with a transmitter, the wireless broadband training sequence comprising multiple orthogonal subcarriers;
   detecting the wireless broadband training sequence with a receiver;
   analyzing a parameter of the detected wireless broadband training sequence; and
   optimizing a subsequently transmitted wireless broadband signal based at least in part upon the analyzed parameter of the wireless broadband training sequence.

2. The method of claim 1 wherein the step of optimizing the wireless broadband signal comprises assigning a subcarrier allocation based at least in part upon the analyzed parameter of the wireless broadband training sequence.

3. The method of claim 2 wherein the assignment of the subcarrier allocation is performed by at least one receiver and is communicated to the transmitter from the at least one receiver.

4. The method of claim 2 wherein the subcarrier allocation is performed by the transmitter.

5. The method of claim 2 further comprising:
   estimating a signal propagation characteristic for a modeled transmission line between the at least one antenna and at least one receiver, the modeled transmission line comprising a duct, an opening in the duct and free air between the opening and the at least one receiver; and
   optimizing the subsequently transmitted wireless broadband signal based at least in part upon the analyzed parameter of the wireless broadband training sequence and the estimated signal propagation characteristic.

6. The method of claim 5 wherein the estimated signal propagation characteristic comprises an estimate of the coherence bandwidth of the modeled transmission line.

7. The method of claim 6 wherein the coherence bandwidth of the modeled transmission line is estimated by computing a total multipath delay spread from a duct delay spread, an opening delay spread, and a free air delay spread.

8. The method of claim 1 wherein the step of optimizing the wireless broadband signal comprises selecting a subcarrier spacing based at least in part upon the analyzed parameter of the wireless broadband training sequence.

9. The method of claim 1 wherein the step of analyzing a parameter of the wireless broadband training sequence comprises analyzing a parameter of at least one pilot subcarrier of the wireless broadband training sequence.

10. The method of claim 1 wherein the analyzed parameter of the wireless broadband training sequence is a subcarrier power level.

11. The method of claim 1 wherein the analyzed parameter of the wireless broadband training sequence is a subcarrier signal to noise ratio.

12. The method of claim 1 further comprising detecting the wireless broadband training sequence with multiple receivers at different physical locations within the building.

13. The method of claim 1 wherein the wireless broadband training sequence comprising multiple orthogonal subcarriers comprises one of an OFDM signal, an OFDMA signal and a SC-FDMA signal.

14. A communications system comprising:
a transmitter of a broadband wireless training sequence comprising multiple orthogonal subcarriers;
a ventilation system within a building, the ventilation system comprising multiple ducts and multiple ventilation openings;
at least one antenna in communication with the transmitter, the at least one antenna being positioned within a duct, the at least one antenna being operative to transmit the wireless broadband training sequence from the transmitter, with transmission occurring from a single location;
at least one receiver located within the building, the receiver being configured to receive the wireless broadband training sequence;
a processor; and
a non-transitory machine-readable medium having encoded thereon a set of instructions executable by the processor to perform one or more operations, the set of instructions comprising:
instructions to analyze a parameter of the wireless broadband training sequence received by the receiver; and
instructions to optimize a subsequently transmitted wireless broadband signal based at least in part upon the analyzed parameter of the wireless broadband training sequence.

15. The communications system of claim 14 wherein the instructions to optimize the wireless broadband signal comprises instructions to assign a subcarrier allocation at least in part upon the analyzed parameter of the wireless broadband training sequence.

16. The communications system of claim 14 further comprising multiple receivers located at physically separated locations within the building.

17. The communications system of claim 14 wherein the instructions to analyze a parameter of the wireless broadband training sequence comprises instructions to analyze a parameter of at least one pilot subcarrier of the wireless broadband training sequence.

18. The communications system of claim 14 wherein the instructions to analyze a parameter of the wireless broadband training sequence comprises instructions to analyze at least one of a sub-carrier power level, and a sub-carrier signal to noise ratio of at least one sub-carrier of the wireless broadband training sequence.

19. The communications system of claim 14 wherein the processor further comprises:
instructions to estimate a signal propagation characteristic for a modeled transmission line between the at least one antenna and at least one receiver, the modeled transmission line comprising a duct, an opening in the duct and free air between the opening and the at least one receiver; and
instructions to optimize the subsequently transmitted wireless broadband signal based at least in part upon the analyzed parameter of the wireless broadband training sequence and the estimated signal propagation characteristic.

20. The communications system of claim 19 wherein the estimated signal propagation characteristic comprises an estimate of the coherence bandwidth of the modeled transmission line.

* * * * *